US011046882B2

(12) United States Patent
Li et al.

(10) Patent No.: US 11,046,882 B2
(45) Date of Patent: Jun. 29, 2021

(54) NANOPARTICLE-ENHANCED RESIN COATED FRAC SAND COMPOSITION

(71) Applicant: Saudi Arabian Oil Company, Dhahran (SA)

(72) Inventors: Wengang Li, Dhahran (SA); Jin Huang, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/924,928

(22) Filed: Jul. 9, 2020

(65) Prior Publication Data

US 2020/0339873 A1 Oct. 29, 2020

Related U.S. Application Data

(62) Division of application No. 15/873,141, filed on Jan. 17, 2018.

(Continued)

(51) Int. Cl.
*C09K 8/64* (2006.01)
*C09K 8/80* (2006.01)
(Continued)

(52) U.S. Cl.
CPC ............... *C09K 8/805* (2013.01); *C09K 8/64* (2013.01); *C09K 8/665* (2013.01); *C09K 8/685* (2013.01);
(Continued)

(58) Field of Classification Search
CPC ...................................................... E21B 43/26
See application file for complete search history.

(56) References Cited

U.S. PATENT DOCUMENTS 3,962,491 A 6/1976 Sato et al.
4,439,489 A 3/1984 Johnson et al.
(Continued)

FOREIGN PATENT DOCUMENTS

CN 104962276 A 10/2015
EP 2623579 A1 8/2013
(Continued)

OTHER PUBLICATIONS

International Search Report and Written Opinion for International Application No. PCT/US2018/017339; dated Apr. 5, 2018; pp. 1-12.

*Primary Examiner* — William D Hutton, Jr.
*Assistant Examiner* — Avi T Skaist
(74) *Attorney, Agent, or Firm* — Bracewell LLP; Constance G. Rhebergen; Brian H. Tompkins

(57) ABSTRACT

A nanoparticle-resin coated frac sand composition is provided. The nanoparticle-resin coated frac sand composition includes a silica sand, an epoxy resin, methanol, a hardener, and nanoparticles. The nanoparticles may be silica nanoparticles, alumina nanoparticles, zinc oxide (ZnO) nanoparticles, or titanium oxide (TiO$_2$) nanoparticles. The methanol is used as a diluent for the epoxy resin. The nanoparticle-resin coated frac sand composition may be used as a proppant in a hydraulic fracturing operation, such by injecting a hydraulic fracturing fluid having the composition into a subterranean formation. Methods of manufacturing the composition and hydraulic fracturing of a subterranean formation are also provided.

4 Claims, 2 Drawing Sheets

Related U.S. Application Data

(60) Provisional application No. 62/456,968, filed on Feb. 9, 2017.

(51) Int. Cl.
*E21B 43/267* (2006.01)
*C09K 8/66* (2006.01)
*C09K 8/88* (2006.01)
*C09K 8/68* (2006.01)

(52) U.S. Cl.
CPC ............ *C09K 8/887* (2013.01); *E21B 43/267* (2013.01); *C09K 2208/10* (2013.01)

(56) References Cited

U.S. PATENT DOCUMENTS

| | | |
|---|---|---|
| 6,668,926 B2 | 12/2003 | Nguyen et al. |
| 7,135,231 B1 | 11/2006 | Sinclair et al. |
| 7,721,803 B2 | 5/2010 | Huang et al. |
| 8,397,812 B2 | 3/2013 | Huang et al. |
| 9,441,152 B2 | 9/2016 | Tang et al. |
| 9,617,463 B2 | 4/2017 | Huang et al. |
| 2005/0051331 A1 | 3/2005 | Nguyen et al. |
| 2007/0036977 A1 | 2/2007 | Sinclair et al. |
| 2010/0286000 A1* | 11/2010 | Huang .................. C09K 8/516 507/261 |
| 2012/0205101 A1 | 8/2012 | Pribytkov et al. |
| 2016/0153273 A1 | 6/2016 | Nguyen et al. |
| 2016/0333259 A1 | 11/2016 | Monastiriotis et al. |

FOREIGN PATENT DOCUMENTS

| | | |
|---|---|---|
| WO | WO2016032417 A1 | 3/2016 |
| WO | WO2016068951 A1 | 5/2016 |

* cited by examiner

NANOPARTICLE-ENHANCED RESIN COATED FRAC SAND COMPOSITION

CROSS-REFERENCE TO RELATED APPLICATIONS

This application is a divisional of and claims priority from U.S. Non-provisional application Ser. No. 15/873,141 filed Jan. 17, 2018, and titled "NANOPARTICLE-ENHANCED RESIN COATED FRAC SAND COMPOSITION, which claims priority from U.S. Provisional Application No. 62/456,968 filed Feb. 9, 2017, and titled "NANOPARTICLE-ENHANCED RESIN COATED FRAC SAND COMPOSITION," each of which are incorporated by reference in their entirety for purposes of United States patent practice.

BACKGROUND

Field of the Disclosure

The present disclosure generally relates to hydraulic fracturing for oil and gas wells. More specifically, embodiments of the disclosure relate to a proppant for use in hydraulic fracturing.

Description of the Related Art

Hydraulic fracturing (also referred to as "fracking") is used to stimulate production in hydrocarbon-containing formations by using materials to break ("fracture") a formation and release hydrocarbons such as oil and gas. After drilling a well, fracturing fluids such as water or chemicals may be injected into the well to reach a sufficient pressure to fracture the formation. A fracturing fluid may contain proppants such as sand (referred to as "frac sand") or ceramic beads to hold open fractures created in the formation. Proppants such as frac sand have been used in hydraulic fracturing for several decades. However due to their brittle properties, existing frac sands are limited to conventional wells with relatively low pressure.

SUMMARY

Embodiments of the disclosure generally relate to a nanoparticles and resin frac sand composition for use as a proppant in hydraulic fracturing. The nanoparticles and resin frac sand composition has improved mechanical properties as compared to conventional frac sand products and may be manufactured using less coating materials (that is, less resin). The nanoparticle-resin coated frac sand maintains a relatively high fracture conductivity for well completion under pressure. By using less coating materials such as resins, the nanoparticle-resin coated frac sand may minimize the reduction of fracture conductivity caused by the deformation of such coating materials under pressure.

In one embodiment, nanoparticle-resin coated frac sand is provided. The nanoparticle-resin coated frac sand includes a silica sand particle at least partially encapsulated by a cross-linked epoxy resin and nanoparticle matrix. The matrix includes at least one nanoparticle adhered to by the cross-linked resin. In some embodiments, the silica sand particle is fully encapsulated by the cross-linked epoxy resin and nanoparticle matrix. In some embodiments, the epoxy resin is bisphenol A epichlorohydrin. In some embodiments, the cross-linked epoxy resin is an epoxy resin polymer cross-linked with a hardener. In some embodiments, the hardener is diethylenetriamine. In some embodiments, the at least one nanoparticle includes a silica nanoparticle.

In another embodiment, a composition for forming a hydraulic fracturing sand particle is provided. The composition includes a silica sand, an epoxy resin, methanol acting as a diluent for the epoxy resin, a hardener, and a plurality of nanoparticles. In some embodiments, the hardener is diethylenetriamine. In some embodiments, the silica sand has a sieve size of 20/40. In some embodiments, the epoxy resin is bisphenol A epichlorohydrin. In some embodiments, the plurality of nanoparticles are a plurality of silica nanoparticles and may have an average diameter in the range of 10 nanometers (nm) to of 70 nm. In some embodiments, the plurality of nanoparticles have a concentration in the range of 4% weight percentage of the total weight (w/w %) to about 5 w/w %.

In another embodiment, a method of manufacturing a composition for forming a hydraulic fracturing sand particle is provided. The method includes diluting an epoxy resin with methanol to form a diluted resin and mixing the diluted resin with a plurality of nanoparticles to form a resin-nanoparticle mixture. The method further includes heating a first amount of a silica sand to a temperature of at least 300° F., adding the resin-nanoparticle mixture to the heated sand to form a resin-nanoparticle-sand mixture, and adding a mixture of hardener and water to the resin-nanoparticle-sand mixture to form a hardener-sand-resin-nanoparticle mixture. The method also includes curing the hardener-sand-resin-nanoparticle mixture for a period and quenching the hardener-sand-resin-nanoparticle mixture by adding a second amount of the silica sand to form the composition. In some embodiments, the mixture of hardener and water includes a volumetric ratio of hardener:water of 1:1. In some embodiments, the period is at least 3 minutes. In some embodiments, the plurality of nanoparticles have a concentration in the range of 4% weight percentage of the total weight (w/w %) to about 5 w/w %. In some embodiments, the hardener is diethylenetriamine. In some embodiments, the sand has a sieve size of 20/40. In some embodiments, the epoxy resin is bisphenol A epichlorohydrin. In some embodiments, the plurality of nanoparticles are a plurality of silica nanoparticles. In some embodiments, the method includes stirring the resin-nanoparticle mixture for at least 5 minutes before mixing the diluted resin with the plurality of nanoparticles to form the resin-nanoparticle mixture. In some embodiments, the method includes stirring the resin-nanoparticle-sand mixture for at least 5 minutes before adding the mixture of hardener and water to the resin-nanoparticle-sand mixture. In some embodiments, the second amount of sand is at least 5 weight percentage of the total weight (w/w %).

In another embodiment, a method of hydraulic fracturing a subterranean formation is provided. The method includes injecting a hydraulic fluid into a subterranean formation. The proppant composition includes a silica sand, an epoxy resin, methanol acting as a diluent for the epoxy resin, a hardener, and a plurality of nanoparticles. In some embodiments, the hardener is diethylenetriamine. In some embodiments, the epoxy resin is bisphenol A epichlorohydrin. In some embodiments, the plurality of nanoparticles are a plurality of silica nanoparticles. In some embodiments, the plurality of nanoparticles have a concentration in the range of 4% weight percentage of the total weight (w/w %) to about 5 w/w %.

DETAILED DESCRIPTION

Figure 1:
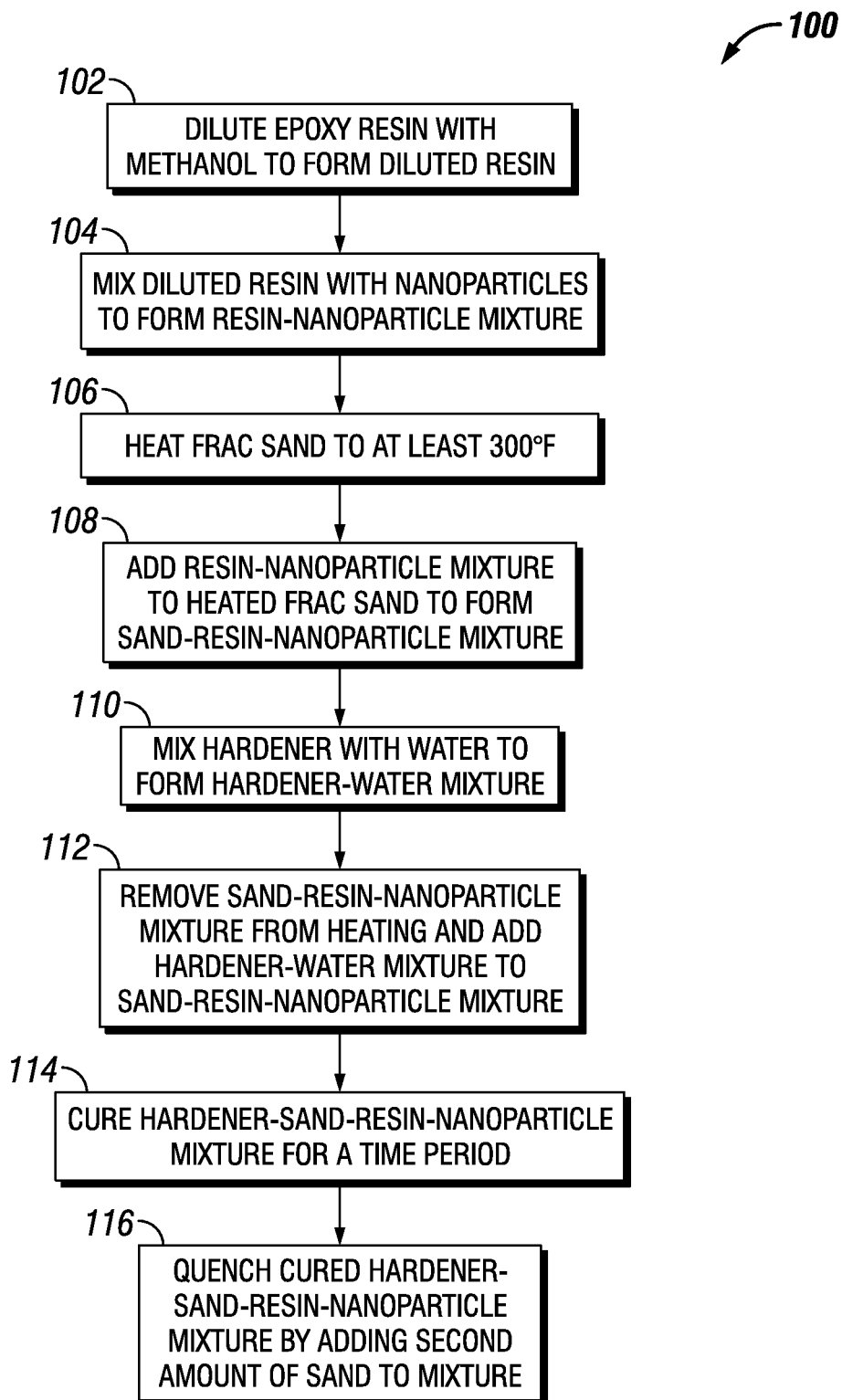
FIG. 1 is a flowchart of a process for manufacturing a nanoparticle-resin coated frac sand composition in accordance with embodiments of the disclosure.

The present disclosure will now be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include a nanoparticle-resin coated frac sand composition for use as a proppant in hydraulic fracturing. The embodiment composition comprises a nanoparticle-resin coated frac sand comprising a silica sand particle at least partially encapsulated by a cross-linked epoxy resin/nanoparticle matrix. In some embodiments, the silica sand particle may be fully encapsulated by the cross-linked epoxy resin/nanoparticle matrix. The cross-linked epoxy resin is an epoxy resin polymer cross-linked with a hardener. The matrix comprises at least one nanoparticle adhered to by the cross-linked epoxy resin. The composition to make the nanoparticle-resin coated frac sand composition includes a silica sand, an epoxy resin, methanol, a hardener, and a plurality of nanoparticles. In some embodiments, the epoxy resin is bisphenol A (BPA) epichlorohydrin. The methanol may be used as a diluent for the epoxy resin. In some embodiments, the hardener is diethylenetriamine, triethylenetrimane, or isophorone diamine. In some embodiments, the nanoparticles may be silica nanoparticles, alumina nanoparticles, zinc oxide (ZnO) nanoparticles, or titanium oxide ($TiO_2$) nanoparticles. In some embodiments, the nanoparticle-resin coated frac sand composition includes a silica sand, bisphenol A epichlorohydrin resin, methanol, diethylenetriamine hardener, and a plurality of silica nanoparticles.

The nanoparticle-resin coated frac sand composition may be used as a proppant in a hydraulic fracturing operation. For example, a hydraulic fracturing fluid may be injected into a subterranean formation to induce fractures in the formation. For example, the hydraulic fracturing fluid may include water and other components, such as polymers, crosslinkers, fluid loss additives, flow back additives, surfactants, clay stabilizers, and gel breakers. In some embodiments, the nanoparticle-resin coated frac sand composition may be added to the hydraulic fracturing fluid as a proppant to hold open induced fractures in a formation, such that injecting the hydraulic fracturing fluid includes injecting the proppant. In some embodiments, the hydraulic fracturing fluid may be injected into a subterranean formation, and a treatment fluid (for example, water) having the nanoparticle-resin coated frac sand composition may be subsequently injected.

Nanoparticle-Enhanced Resin Coated Frac Sand Compositions and Manufacture

In some embodiments, a nanoparticle-resin coated frac sand composition includes a sand, a resin, a resin diluent, a hardener, and nanoparticles to produce a plurality of sand particles at least partially encapsulated by a cross-linked epoxy resin/nanoparticle matrix. In some embodiments, for example, a nanoparticle-resin coated frac sand composition includes a sand, an epoxy resin, methanol, a hardener, and nanoparticles to produce a plurality of sand particles at least partially encapsulated by a cross-linked epoxy resin/nanoparticle matrix. In some embodiments, the sand is 20/40 silica sand (that is, a silica sand having a sieve cut of 20/40 such that the sand particles have a size range of about 420 µm to about 840 µm). In other embodiments, other sizes of silica sands may be used.

In some embodiments, the epoxy resin is bisphenol A epichlorohydrin. In some embodiments, the epoxy resin is Razeen® epoxy resin manufactured by Jubail Chemical Industries Company (JANA) of Jubail, Saudi Arabia. For example, in some embodiments, the epoxy resin may be Razeen® LR1100 manufactured by Jubail Chemical Industries Company (JANA) of Jubail, Saudi Arabia. In other embodiments, other Razeen® epoxy resins or other suitable resins may be used. For example, in other embodiments, the resin may be a phenolic resin, a polyurethane resin, a polyuria resin, or a polyester resin. In some embodiments, the diluent for the resin may be methanol. In other embodiments, the diluent may include other suitable polar solvents, such as ethanol, xylene, methylethylketone, and acetone.

In some embodiments, the hardener is an amino hardener. In some embodiments, for example, the hardener is diethylenetriamine. In other embodiments, the hardener may be triethylenetrimane or isophorone diamine. In yet other embodiments, the hardener may be an aldehyde hardener.

In some embodiments, the nanoparticles are silica nanoparticles. In such embodiments the silicon nanoparticles may have an average diameter of 70 nm. In other embodiments, the silica nanoparticles have an average diameter of 10 nm. In other embodiments, the silica nanoparticles used in the frac sand composition may have an average diameter in the range of about 10 nm to about 70 nm. In some embodiments, the silica nanoparticles may be obtained from AkzoNobel of Amsterdam, the Netherlands. In other embodiments, the frac sand composition may include other types of nanoparticles having an average diameter in the range of about 100 nm to about 600 nm. For example, in some embodiments, the nanoparticles may be metal oxide particles such as alumina nanoparticles, zinc oxide (ZnO) nanoparticles, or titanium oxide ($TiO_2$) nanoparticles. In some embodiments, the nanoparticles may be alumina nanoparticles having an average diameter of 100 nm. In some embodiments, the nanoparticles may be zinc oxide nanoparticles having an average diameter of 650 nm. In some embodiments, the nanoparticles may be titanium oxide nanoparticles having an average diameter of 360 nm.

In some embodiments, commercially available particles may be used. Table 1 lists example particles, sizes, states, and solvents for various commercially available particles suitable for use with the nanoparticle-resin coated frac sand composition described in the disclosure:

TABLE 1

Example Particles

| Name and Chemical Formula | Average Particle Size (nm) | State (Dispersion or Solid) | Solvent | Manufacturer (Product Name) |
| --- | --- | --- | --- | --- |
| silica ($SiO_2$) | 17 | Dispersion | Water | AkzoNobel of Amsterdam, the Netherlands (CB17) |
| silica ($SiO_2$) | 12 | Dispersion | Water and ethanol | AkzoNobel of Amsterdam, the Netherlands (CC401) |
| zinc oxide (ZnO) | 650 | Solid | N/A | Arabian Zinc of Al Jubail, Saudi |

TABLE 1-continued

Example Particles

| Name and Chemical Formula | Average Particle Size (nm) | State (Dispersion or Solid) | Solvent | Manufacturer (Product Name) |
|---|---|---|---|---|
| titania (TiO$_2$) | 360 | Solid | N/A | Arabia (SA901) Sigma-Aldrich of St Louis, Missouri, USA |
| alumina (Al$_2$O$_3$) | 90 | Solid | N/A | N/A |

In embodiments, the nanoparticle-resin coated frac sand composition may include a nanoparticle concentration in the range of about 4 weight percentage of the total weight (w/w %) to about 5 w/w %. In some embodiments, the weight ratio of sand:resin:hardener:nanoparticles may be 100:3:0.6:0.15. In other embodiments, the amounts of resin and hardener may be adjusted based on the amount of nanoparticles included in the composition. In some embodiments, a nanoparticle-resin coated frac sand composition includes silica sand, bisphenol A epichlorohydrin resin, methanol, triethylenetrimane hardener, and silica nanoparticles.

FIG. 1 depicts a process 100 for manufacturing a nanoparticle-resin coated frac sand composition in accordance with an embodiment of the disclosure. Initially, a resin (for example, an epoxy resin) for use in the composition may be diluted with a diluent (for example, methanol) to from a diluted resin. For example, an epoxy resin may be diluted 10% by volume with methanol to form the diluted resin (block 1012). The diluted resin may be mixed with nanoparticles to form a resin-nanoparticle mixture (block 104). For example, the diluted resin may be mixed with silica nanoparticles, alumina nanoparticles, zinc oxide (ZnO) nanoparticles, or titanium oxide (TiO$_2$) nanoparticles. The diluted resin and nanoparticles may be stirred to ensure homogenous dispersal of the nanoparticles in the resin. For example, the diluted resin and nanoparticles may be stirred for a time period of at least 5 minutes.

Next, a silica sand for use in the composition may be heated to a temperature of at least 300° F. (block 106). The resin-nanoparticle mixture may be added to the heated sand to form a sand-resin-nanoparticle mixture (block 108). For example, in some embodiments the resin-nanoparticle mixture drop-by-drop using a syringe or other suitable device, and the resulting sand-resin-nanoparticle mixture may be stirred for a time period, such as 5 minutes.

A hardener for use in the composition may be mixed with water to form a hardener-water mixture (block 110). In some embodiments, the hardener may be mixed with water in a volumetric ratio of 1:1. In some embodiments, for example, the hardener may be diethylenetriamine, triethylenetrimane, or isophorone diamine. Next, the sand-resin-nanoparticle mixture may be removed from heating, and the hardener-water mixture may be added to the sand-resin-nanoparticle mixture to form a hardener-sand-resin-nanoparticle mixture (block 112). In some embodiments, the hardener-water mixture may be added to the sand-resin-nanoparticle mixture using a syringe or other suitable device.

Next, the hardener-frac sand-resin-nanoparticle mixture may be cured for a time period (block 114). In some embodiments, the hardener-frac sand-resin-nanoparticle mixture may be cured for a time period of at least 5 minutes. The cured hardener-frac sand-resin-nanoparticle mixture may then be quenched by adding a second amount of sand to the mixture to form the proppant composition (block 116).

In some embodiments, the second amount of sand may be at least 5 w/w % of the hardener-frac sand-resin-nanoparticle mixture. The nanoparticle-resin coated frac sand composition produces a plurality of sand particles at least partially encapsulated by a cross-linked epoxy resin/nanoparticle matrix.

The nanoparticle-resin coated frac sand composition forms hydraulic fracturing sand particles that may be used in a hydraulic fracturing operation to hold open fractures created in the formation after inducement of the fractures. In some embodiments, a process of hydraulic fracturing a subterranean formation may be performed by injecting a hydraulic fracturing fluid having the nanoparticle-resin frac sand composition into a subterranean formation. For example, the hydraulic fracturing fluid may include water and other components, such as polymers, crosslinkers, fluid loss additives, flow back additives, surfactants, clay stabilizers, and gel breakers. In some embodiments, a treatment fluid containing the nanoparticle-resin frac sand composition may be injected into the subterranean formation after injection of a hydraulic fracturing fluid. For example, the treatment fluid may be water such that water having the nanoparticle-resin frac sand composition may be injected into the subterranean formation.

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

An example nanoparticle-resin coated frac sand composition was prepared and tested according to the techniques described herein. The example nanoparticle-resin coated frac sand includes a silica sand, an epoxy resin of bisphenol-A epicholorhydrin, a hardener of diethylenetriamine, methanol, and silica nanoparticles. The silica sand had a sieve cut of 20/40 (that is, the size range of the silica sand particles range between sieve mesh sizes 20 and 40 (420 micrometers (µm)-840 µm). The epoxy resin was Razeen® epoxy resin obtained from Jubail Chemical Industries Company (JANA) of Jubail, Saudi Arabia. The epoxy resin was selected as the resin backbone for coating the silica sand and reacted with the hardener when treated. The hardener was used to crosslink the epoxy resin backbones via a ring-opening reaction of the amino groups, such that the diethylenetriamine molecules react with the resin molecules and become part of the crosslinked epoxy resin backbones. The methanol was used to dilute the epoxy resin and ensure sufficient mixing with the silica nanoparticle dispersion. The silica nanoparticles were obtained from AkzoNobel of Amsterdam, Netherlands. The silica nanoparticles had an average diameter of 70 nanometers (nm) and were dispersed in water at a concentration of about 40 w/w %. The silica nanoparticles were used as fillings of the epoxy resin to enhance the mechanical properties of the resin coating of the silica sand.

The example nanoparticle-resin coated frac sand was prepared according to a weight ratio of sand:resin:hardener:nanoparticles (that is, the weight of pure nanoparticles) of 100:3:0.6:0.15. The concentration of silica nanoparticles (that is, the weight of pure nanoparticles) to epoxy resin was 5 w/w %. The example nanoparticle-resin coated frac sand was prepared and tested according to the following procedure:

1. The silica nanoparticles were mixed with the resin by diluting the resin with methanol with a volume of 10% and then mixing the diluted resin with the silica nanoparticles. The resin-nanoparticle mixture was stirred for a time period of 5 minutes such that the nanoparticles were homogenously dispersed in the resin.

2. The frac sand was heated to a temperature of about 300° F. and stirred with a mechanical mixer while heated.

3. The resin-nanoparticle mixture was added to the frac sand drop-by-drop via a syringe. After the addition of all of the resin-nanoparticle mixture, the resulting mixture was stirred via the mechanical mixer for a time period of 5 minutes.

4. The hardener was mixed with water in a ratio of 1:1 by volume to slow the curing speed and avoid aggregation. The frac sand resin-nanoparticle mixture was removed from heating and the hardener-water mixture was added to the frac sand resin-nanoparticle mixture drop by drop via a syringe. The hardener-frac sand-resin-nanoparticle mixture was allowed to cure for a time period of about 3 minutes.

5. The hardener-frac sand-resin-nanoparticle mixture was quenched by adding 5 w/w % of frac sand to the mixture. The added frac sand may be at room temperature to absorb heat from and cool the heated hardener-frac sand-resin-nanoparticle mixture. After quenching the temperature of the mixture was cooled to about 200° F. The mixture was allowed to further cool at ambient conditions.

6. Sieve analysis was performed on the nanoparticle-resin coated frac sand, frac sand (20/40) without resin, and frac sand coated with resin without the silica nanoparticles to determine the size distribution for each frac sand. The sieves used in the sieve analysis were mesh sizes 16, 20, 25, 30, 35, 40, and 50. Table 2 depicts the results of the sieve analysis:

TABLE 2

Sieve Analysis Results

| Sieve Size | Frac sand (20/40) | Frac sand coated with resin without the silica nanoparticles | Nanoparticle-resin coated frac sand |
|---|---|---|---|
| 16 | 0.02% | 9.61% | 3.17% |
| 20 | 0.61% | 48.46% | 19.17% |
| 25 | 80.34% | 34.80% | 68.53% |
| 30 | 18.05% | 6.31% | 7.17% |
| 35 | 0.96% | 0.73% | 1.65% |

7. A crushing test was performed on example nanoparticle-resin coated frac sand, frac sand (20/40 silica sand) without resin, and frac sand coated with resin without the silica nanoparticles. The crushing test was performed according to International Organization for Standardization (ISO) 13503-2:2006.

Figure 2:
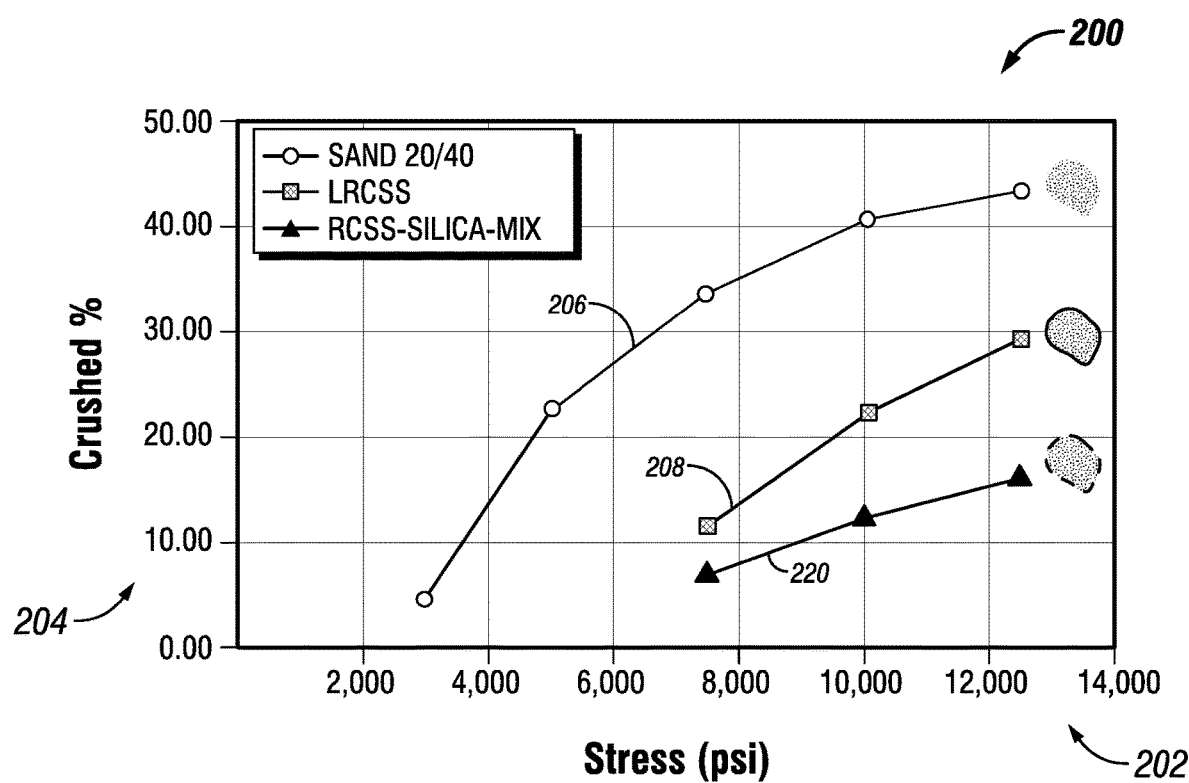
FIG. 2 is a plot of the results of a crushing test performed on a frac sand, a frac sand coated with resin, and an example nanoparticle-resin coated frac sand composition in accordance with embodiments of the disclosure.

FIG. 2 depicts the results of the crushing test performed on a frac sand, a frac sand coated with resin without nanoparticles, and the example nanoparticle-resin coated frac sand. FIG. 1 is a plot 200 of stress (in pounds-per-square inch (psi) and shown on the x-axis 202) vs. crushed percentage (shown on the y-axis 204) and depicts performance of the various frac sand compositions in response to crushing stress. For example, the crushing results for the 20/40 frac sand without resin are represented by line 206, the crushing results for the resin coated frac sand without nanoparticles are represented by line 206, and the crushing results for the example nanoparticle-resin coated frac sand is represented by line 210.

As shown in FIG. 1, at least 20% of the 20/40 frac sand without resin was crushed at a stress of about 5,000 psi, and nearly half of the 20/40 frac sand without resin was crushed at a stress of about 12,500 psi. The resin-coated frac sand without nanoparticles performed better than the 20/40 frac sand, as 10,000 psi stress was required to crush over 20% of the resin-coated frac sand without nanoparticles. As shown in FIG. 1, the example nanoparticle-resin coated frac sand outperformed the 20/40 frac sand and the resin-coated frac sand without nanoparticles. For example, at 10,000 psi stress, less than 20% of the example nanoparticle-resin coated frac sand composition was crushed. Even at 12,500 psi stress, less than 20% of the example nanoparticle-resin frac sand composition was crushed.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method of hydraulic fracturing a subterranean formation, the method comprising:
   injecting a hydraulic fluid into a subterranean formation, the hydraulic fluid having a proppant composition, wherein the proppant composition comprises:
   a silica sand;
   a resin;
   a diluent for the resin;
   a hardener; and
   a plurality of nanoparticles, wherein the nanoparticles are selected from the group consisting of zinc oxide nanoparticles and titania nanoparticles, wherein the plurality of nanoparticles have a concentration in the range of 4% weight percentage of the total weight (w/w %) to about 5 w/w %, and a crushing performance of less than 20% crushed at 12,500 psi stress.

2. The method of claim 1, wherein the hardener comprises diethylenetriamine.

3. The method of claim 1, wherein the resin comprises an epoxy resin.

4. The method of claim 1, comprising preparing the proppant composition, wherein preparing the proppant composition comprises:
   diluting the resin with the diluent to form a diluted resin;

mixing the diluted resin with the plurality of nanoparticles to form a resin-nanoparticle mixture;
heating a first amount of the silica sand;
adding the resin-nanoparticle mixture to the heated sand to form a resin-nanoparticle-sand mixture;
adding a mixture of the hardener and water to the resin-nanoparticle-sand mixture to form a hardener-sand-resin-nanoparticle mixture;
curing the hardener-sand-resin-nanoparticle mixture; and
quenching the hardener-sand-resin-nanoparticle mixture by adding a second amount of the silica sand.

* * * * *